US006200640B1

(12) United States Patent
Kneip et al.

(10) Patent No.: US 6,200,640 B1
(45) Date of Patent: Mar. 13, 2001

(54) POLYMER COMPOSITION AND PROCESS FOR TREATING LEATHER AND FUR SKINS

(75) Inventors: Michael Kneip; Axel Kistenmacher; Peter Danisch, all of Ludwigshafen; Gerhard Wolf, Ketsch, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/147,078

(22) PCT Filed: Mar. 27, 1997

(86) PCT No.: PCT/EP97/01593

§ 371 Date: Nov. 9, 1998

§ 102(e) Date: Nov. 9, 1998

(87) PCT Pub. No.: WO97/37046

PCT Pub. Date: Oct. 9, 1997

(30) Foreign Application Priority Data

Apr. 1, 1996 (DE) .............................. 196 12 986

(51) Int. Cl.$^7$ .............. C14C 9/00; C14C 9/02; C14C 9/28; C08F 22/04; C08F 8/12

(52) U.S. Cl. ............... 427/389; 428/433; 252/8.57; 8/94.33; 8/94.26; 8/94.1 R; 8/94.11; 8/94.21; 524/549; 524/555; 524/556; 525/327.8; 526/318.5

(58) Field of Search ............... 428/433; 427/389; 8/94.33, 94.26, 94.11, 94.21; 252/8.57; 524/549, 555, 556; 526/318.5; 525/327.8

(56) References Cited

U.S. PATENT DOCUMENTS

| 5,279,613 | 1/1994 | Schaffer et al. |
|---|---|---|
| 5,286,263 | 2/1994 | Schaffer et al. |
| 5,348,807 | * 9/1994 | Hodder et al. ............ 8/94.33 |
| 5,472,741 | 12/1995 | Sackman et al. |

FOREIGN PATENT DOCUMENTS

| 41 29 244 | 3/1993 | (DE) . |
|---|---|---|
| 43 34 796 | 4/1995 | (DE) . |
| 44 02 029 | 7/1995 | (DE) . |
| 196 08 044 | 9/1997 | (DE) . |
| 0 216 089 | 4/1987 | (EP) . |
| 0 372 746 | 6/1990 | (EP) . |
| 0 412 389 | 2/1991 | (EP) . |
| 0 486 608 | 5/1992 | (EP) . |
| 0 498 634 | 8/1992 | (EP) . |
| 0 579 267 | 1/1994 | (EP) . |
| 0 581 327 | 2/1994 | (EP) . |
| 223833 | * 8/1994 | (JP) . |
| 325766 | * 11/1994 | (JP) . |

* cited by examiner

Primary Examiner—Donald R. Wilson
(74) Attorney, Agent, or Firm—Oblon, Spivak, McClelland, Maier & Neustadt, P.C.

(57) ABSTRACT

Aqueous solutions or dispersions of copolymers obtainable by free-radical copolymerization of (a) from 20 to 90% by weight of at least one monoethylenically unsaturated $C_{4-6}$-dicarboxylic acid or the anhydride thereof, as component A, (b) from 5 to 50% by weight of at least one olefin having 2 to 6 carbon atoms, as component B, (c) from 5 to 50% by weight of at least one hydrophobic comonomer from the group consisting of long-chain olefins, esters of long-chain alcohols with acrylic acid or methacrylic acid, long-chain amides of acrylic acid or methacrylic acid, and long-chain alkyl vinyl ethers, as component C, (d) from 0 to 40% by weight of further comonomers which can be copolymerized with the above monomers, as component D, where the sum of the amounts of components A, B, C and, if used, D is 100% by weight, followed by at least partial esterification or hydrolysis and neutralization and/or reaction of the carboxyl groups formed during the hydrolysis with bases, for treating leather and/or fur skins.

15 Claims, No Drawings

POLYMER COMPOSITION AND PROCESS FOR TREATING LEATHER AND FUR SKINS

The present invention relates to the use of aqueous solutions or dispersions of copolymers based on ethylenically unsaturated dicarboxylic acids or dicarboxylic anhydrides, lower olefins and hydrophobic comonomers for retanning, fat-liquoring or hydrophobicizing leather and fur skins, and to some of the copolymers used, process for their preparation and leather treatment composition comprising these copolymers.

DE-C 2 629 748 discloses the use of copolymers of linear $C_{10}$- to $C_{30}$-olefins and maleic anhydride which have been hydrolyzed by means of alkali metal bases or amines for filling and fat-liquoring leather and fur skins.

EP-A-0 412 389 discloses the use of aqueous solutions or dispersions of partially neutralized copolymers of maleic anhydride with $C_8$- to $C_{40}$-olefins and their polymer-analogous reaction products for hydrophobicizing leather and fur skins. Examples of olefin components which are mentioned are 1-octene, diisobutene, 1-decene, 1-dodecene, 1-tetradecene, 1-hexadecene and cyclooctene. Polymerization is carried our in substance.

EP-B-0 486 608 discloses the use of copolymers based on maleic anhydride, octadecyl vinyl ether and, if appropriate, n-1-octadecene for hydrophobicizing leather and fur skins.

EP-A-0 579 267, EP-A-0 581 327, EP-A-0 372 746 and EP-A-0 498 634 describe amphiphilic copolymers comprising a greater proportion by weight of a hydrophobic comonomer and a lesser proportion by weight of a hydrophilic comonomer, and their use for treating leather.

The copolymers used in accordance with EP-A-0 581 327 and EP-A-0 498 634 as retanning fat-liquoring agents for the production of leather having improved fogging properties for use in automobiles are preferably prepared by emulsion polymerization. However, dispersions prepared in this way contain certain amounts of surfactants. This is disadvantageous in the treatment of leather with these agents, since they increase the water wettability, making production of water-repellent leather more difficult.

DE-A-4 334 796 discloses products of the esterification of terpolymers of maleic anhydride, diisobutene and styrene, certain styrene derivatives, vinyl acetate, allyl acetate, isobutyl vinyl ether, allyl alcohol or methallyl alcohol with fatty alcohols as retanning materials for leather.

The German Patent Application having the file reference 196 08 044.4 having the title "Use of hydrophobicized copolymers of monoethylenically unsaturated dicarboxylic acids and olefins having 2 to 8 carbon atoms in detergents and cleaning materials", which has an earlier priority date, but was not published before the priority date of the present application, describes terpolymers of isobutene, maleic anhydride and a $C_{20-24}$-olefin which have been neutralized using sodium hydroxide solution. The $C_{20-24}$-olefin can also be replaced by 1-octadecene. The polymers are used as an additive to detergents and cleaning materials. Reference is made in general form to copolymers comprising monoethylenically unsaturated dicarboxylic acids, their anhydrides or alkali metal and/or ammonium salts, olefins having 3 to 8 carbon atoms, olefins having 10 to 150 carbon atoms and other comonomers.

The polymers known for retanning, fat-liquoring and in particular hydrophobicizing leather frequentiy have the disadvantage of only penetrating into superficial layers of the flesh or hair side of the leather, so that hydrophobicization of the entire leather cross section is not achieved. In addition, the dyeability and hand of the leather are frequently impaired.

Furthermore, the known dispersions developed for retanning, fat-liquoring or hydrophobicizing frequently tend to coagulate or thicken on storage. These changes as a consequence of storage further impair the penetration behavior of these productions.

Commercially available polymeric retanning materials are often hydrophilic and are little suited to the hydrophobicization of leather. On the other hand, polymeric hydrophobicizing agents likewise have retanning, filling properties, but are not always distributed well over the leather cross section. Different results are achieved depending on the previous history of the wet-blue (=intermediate in the production of leather which is traded worldwide and comes between the skin and the finished leather during processing) employed. Since wet-blues are nowadays in many cases purchased from various sources and therefore have different pious histories, the tanner does not achieve uniform results in his production.

It is an object of the present invention to provide suitable hydrophobic, polymer-based retanning materials which enable good penetration through the leather cross section and support the hydrophobicization and/or fat-liquoring. They are intended to overcome disadvantages of the known retanning materials.

We have found that this object is achieved by using aqueous solutions or dispersions of copolymers obtainable by free-radical copolymerization of (a) from 20 to 90% by weight of at least one monoethylenically unsated $C_{4-6}$-dicarboxylic acid or the anhydride thereof, as component A, (b) from 5 to 50% by weight of at least one olefin having 2 to 6 carbon atoms, as component B, (c) from 5 to 50% by weight of at least one hydrophobic comonomer from the group consisting of long-chain olefins, esters of long-chain alcohols with acrylic acid or methacrylic acid, long-chain amides of acrylic acid or methacrylic acid, and long-chain alkyl vinyl ethers, as component C, (d) from 0 to 40% by weight of further comonomers which can be copolymerized with the above monomers, as component D, where the sum of the amounts of components A, B, C and, if used, D is 100% by weight,
followed by at least partial esterification or hydrolysis and neutralization and/or reaction of the carboxyl groups formed during the hydrolysis with bases, for treating leather and/or fur skins.

The object is also achieved by the provision of a copolymer obtainable by free-radical copolymerization of (a) from 20 to 89% by weight of at least one monoethylenically unsaturated $C_{4-6}$-dicarboxylic acid or the anhydride thereof, as component A.

(b) from 5 to 50% by weight of at least one olefin having 2 to 6 carbon atoms, as component B, (c) from 5 to 50% by weight of at least one hydrophobic comonomer from the group consisting of long-chain olefins, esters of long-chain alcohols with acrylic acid or methacrylic acid, long-chain amides of acrylic acid or methacrylic acid, and long-chain alkyl vinyl ethers, as component C, (d) from 1 to 15% by weight of further comonomers which can be copolymerized with the above monomers, as component D, where the sum of the amounts of components A, B, C and D is 100% by weight, followed, if desired, by at least partial esterification or hydrolysis and neutralization and/or reaction of the carboxyl groups formed during the hydrolysis with bases.

It has been found that the polymers used in accordance with the invention satisfy both requirement: good product distribution over the leather cross section and an action which is not disadvantageous, but instead is supportive of the hydrophobicization of the leather.

The present invention provides, in particular, the use of aqueous solutions or dispersions of these copolymers as agents for retanning, fat-liquoring or these hydrophobicizing leather and/or fur skins.

However, the anhydride groups present in the copolymer can also be partially or fully solvolyzed using hydroxyl-functional compounds or amines. Examples thereof are mono-, di- or triethanolamine, morpholine and sarcosine. Any anhydride groups remaining are subjected to aqueous hydrolysis. The carboxyl groups remaining are preferably at least partially neutralized using bases. Examples of bases which can be employed are alkali and alkaline earth metal hydroxides, alkali and alkaline earth metal carbonates, ammonia and amines.

The copolymers described are used as retanning materials which provide the leather with good filling, dye penetration and a pleasant hand. In addition, they improve the distribution of the hydrophobicizing agent or fat-liquoring agent and increase the hydrophobic character of the leather.

It has been found that copolymers of, for example, maleic anhydride, a short-chain olefin and a long-chain olefin penetrate leather well and at the same time support hydrophobicization.

For an optimum hydrophobicization action, conventional metal-salt fixing using, for example, $Cr^{3+}$, $Al^{3+}$ or $Zr^{4+}$ salts follows additionally at the end of retanning. Besides in retanning, the copolymers described, owing to their excellent acid and electrolyte stability, can also be used in chrome tanning or in acid removal. The copolymers described can also be used proportionately in hydrophobicizing agents based on long-chain hydrocarbons, such as paraffins, paraffin oils, mineral oils or waxes.

The polymers described can advantageously be used at all stages of leather production where conventional surfactants or emulsifiers or dispersants, such as nonionic surfactants, make hydrophobicization of the leather more difficult or—depending on the requirements—even impossible. The copolymers of the invention can therefore also be used as dispersion or emulsification auxiliaries as a component of fat-liquoring agents. The amount of the copolymer of the invention used for this purpose is 1 to 50% by weight, in particular 2 to 20% by weight, very particularly 4 to 16% by weight.

The copolymers described are furthermore suitable as constituents of agents for degreasing leather and fur skins. These agents are necessary to remove natural grease from the animal skins, since inadequate degreasing results in uneven tanning and dyeing and in the formation of fatty spew caused by bacterial degradation of the greases and crystallization of certain fatty acids during storage. Therefore—in particular for ecological reasons—emulsifier degreasing is carried out, in which the anionic and nonionic surfactants and mixtures of these two types are used. The presence of the copolymers described reduces the proportion of surfactants.

In addition, the copolymers described can be combined extremely well in mixtures with synthetic aromatic tanning agents or precursors thereof or sodium or ammonium salts thereof, thus achieving a synergistic combination of effects.

In this way, leather is obtained which is distinguished, in particular, by good filling, good softness, a round hand, significantly better dye penetration and significantly improved hydrophobicization. These combinations allow the amount of tanning agents employed to be reduced in overall terms and thus enable an improvement in the economic efficiency of leather production.

Firstly, the components of the copolymers are described.

COMPONENT A

Suitable monomers of component A are monoethylenically unsaturated dicarboxylic anhydrides having 4 to 6 carbon atoms, such as maleic anhydride, itaconic anhydride, citraconic anhydride and mixtures thereof with one another. Preference is given to maleic anhydride. Component A is preferably employed in amounts of from 40 to 80% by weight, particularly preferably from 50 to 70% by weight.

COMPONENT B

The monomers of component B are linear, branched or cyclic aliphatic olefins having 2 to 6 carbon atoms, such as ethene, propene, 1-butene, cyclobutene, methylenecyclopropane, isobutene, 1-pentene, cyclopentene, methylenecyclobutane, 2-methyl-1-butene, 3-methyl-1-butene, 1-hexene, cyclohexene, methylenecyclopentene, 2,3-dimethyl-1-butene, 3,3-dimethyl-1-butene, 2-ethyl-1-butene, 2-methyl-1-pentene, 3-methyl-1-pentene, 4-methyl-1-pentene, or mixtures thereof. Preference is given to ethene, propene, 1-butene, isobutene, 1-pentene, cyclopentene, 1-hexene, cyclohexene or mixtures thereof. Component B is preferably employed in amounts of from 10 to 40% by weight, particularly preferably from 10 to 30% by weight.

COMPONENT C

Preferred monomers of component C are aliphatic olefins having at least 10 carbon atoms. These are, for example, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, 1-dotriacontene, 1-tetratriacontene, 1-hexatriacontene, 1-octatriacontene, 1-tetracontene, 1-dotetracontene, 1-tetratetracontene, 1-hexatetracontene, 1-octatetracontene, 1-pentacontene, 1-hexacontene or technical-grade olefin mixtures, such as $C_{12-14}$-olefins, $C_{20-24}$-olefins, $C_{24-28}$-olefins, $C_{30+}$-olefins, or oligoolefins prepared by means of metallocene catalysis, such as oligopropene, oligohexene or oligooctadecene, or olefins having a high α-olefin content prepared by cationic polymerization, such as polyisobutene, or mixtures of various of these olefins.

The monomers of component C are furthermore the esters of acrylic acid or of methacrylic acid with alcohols having at least 8 carbon atoms. These are, for example, 2-ethylhexyl (meth)acrylate, decyl (meth)acrylate, lauryl (meth)acrylate, isotridecyl (meth)acrylate, tetradecyl (meth)acrylate, stearyl (meth)acrylate, palmityl (meth)acrylate, n-eicosyl (meth) acrylate or (meth)acrylic esters of alcohol mixtures, for example $C_{12-14}$-fatty alcohols, $C_{13-15}$-oxo alcohols, $C_{16-18}$-fatty alcohols, $C_{12-18}$-fatty alcohols or (meth)acrylic esters of alkoxylated alcohols or alcohol mixtures having at least 8 carbon atoms.

The monomers of component C are furthermore the amides of acrylic acid or of methacrylic acid with amines having at least 8 carbon atoms. These are, for example, N-dodecyl(meth)acrylamide and N-ociadecyl(meth) acrylamide.

The monomers of component C are furthermore alkyl vinyl ethers having at least 8 carbon atoms in the alkyl chain. These are, for example, n-octyl vinyl ether, 2-ethylhexyl vinyl ether, 2,2,4-trimethylpentyl vinyl ether, n-decyl vinyl ether, dodecyl vinyl ether, n-hexadecyl vinyl ether, n-octadecyl vinyl ether or mixtures thereof.

The monomers of component C can furthermore be fluoroolefins having at least 6 carbon atoms. These are, for example, perfluorooctylethene or perfluorodecylethene.

Preferred monomers of component C are aliphatic olefins having at least 10 carbon atoms.

Component C is preferably employed in amounts of from 5 to 30% by weight, particularly preferably from 5 to 25 % by weight.

COMPONENT D

The monomers of component D are preferably acrylic acid, methacrylic acid, methyl vinyl ether, ethyl vinyl ether, 2-acrylamido-2-methylpropanesulfonic acid, methyl (meth)acrylate, ethyl (meth)acrylate, butyl (meth)acrylate, hydroxyethyl (meth)acrylate, hydroxypropyl (meth)acrylate, 1- or 2-(N,N-dimethylamino)ethyl (meth)acrylate, 3-(N,N-dimethylarnino)propyl (meth)acrylate, 3-dimethylaminopropyl(meth)acrylamide, vinyl acetate, vinyl propionate, N-vinylformamide, styrene, α-methylstyrene, N-vinylpyrrolidone, N-vinylimidazole, acrylonitrile, acrolein, methacrolein or mixtures thereof.

Preference is given to acrylic acid, methacrylic acid, methyl methacrylate, 1- or 2-N,N dimethylaminoethyl acrylate, styrene or mixtures thereof. Component D is preferably employed in amounts of from 0 to 30% by weight, particularly preferably from 0 to 15% by weight.

The sum of the amounts of components A, B, C and, if used, D is always 100% by weight. If a copolymer of components A, B, C and D is employed, the amounts of the above components are A: from 20 to 90% by weight, preferably from 40 to 80% by weight, particularly preferably from 50 to 70% by weight, B: from 5 to 50% by weight, preferably from 10 to 40% by weight particularly preferably from 10 to 30% by weight, C: from 5 to 50% by weight, preferably from 5 to 30% by weight, particularly preferably from 5 to 25% by weight, D: from 1 to 40% by weight, preferably from 2 to 20% by weight, particularly preferably from 3 to 15% by weight, In a particular embodiment, the amount of component D is from 1 to 15% by weight, preferably from 2 to 13% by weight, in particular from 3 to 12.5% by weight. The invention also relates to copolymers which have this particular content of component D and the abovementioned contents of components A, B and C. In these copolymers, component A is preferably at least one comonomer from the group consisting of maleic anhydride, itaconic anhydride and citraconic anhydride, preferably maleic anhydride, and/or component B is at least one comonomer from the group consisting of ethene, propene, 1-butene, isobutene, 1-hexene, cyclopentene and cyclohexene, and/or component C is at least one comonomer from the group consisting of aliphatic olefins having at least 10 carbon atoms, and/or component D is at least one comonomer from the group consisting of acrylic acid, methacrylic acid, methyl vinyl ether, ethyl vinyl ether, 2-acrylamido-2-methylpropanesulfonic acid, methyl (meth)acrylate, ethyl (meth)acrylate, butyl (meth)acrylate, hydroxyethyl (meth)acrylate, hydroxypropyl (meth)acrylate, 2-(N,N-dimethylamino)ethyl (meth)acrylate, 3-(N,N-dimethylamino)propyl (meth)acrylate, 3-dimethylaminopropyl(meth)acrylamide, vinyl acetate, vinyl propionate, N-vinylformamide, styrene, α-methylstyrene, N-vinylpyrrolidone, N-vinylimidazole, acrylonitrile, acrolein and methacrolein.

The invention also relates to copolymers obtainable by free-radical copolymerization of (a) from 20 to 89% by weight of at least one monoethylenically unsaturated $C_4$- to $C_6$-dicarboxylic acid or the anhydride thereof, as component A, (b) from 5 to 50% by weight of at least one olefin having 2 to 6 carbon atoms, as component B, (c) from 5 to 50% by weight of at least one hydrophobic comonomer from the group consisting of long-chain olefins, esters of long-chain alcohols with acrylic acid or methacrylic acid, long-chain amides of acrylic acid or methacrylic acid, and long-chain alkyl vinyl ethers, as component C, (d) from 1 to 40% by weight of at least one comonomer from the group consisting of acrylic acid, methacrylic acid, methyl methacrylate, N,N-dimethylaminoethyl acrylate and styrene, as component D, where the sum of the amounts of components A, B, C and, if used, D is 100% by weight, followed, if desired, by at least partial esterification or hydrolysis and at least partial neutralization and/or reaction of the carboxyl groups formed during the hydrolysis with bases.

In these copolymers, component A is preferably at least one comonomer from the group consisting of maleic anhydride, itaconic anhydride and citraconic anhydride, preferably maleic anhydride, and/or component B is at least one comonomer from the group consisting of ethene, propene, 1-butene, isobutene, 1-hexene, cyclopentene and cyclohexene, and/or component C is at least one comonomer from the group consisting of aliphatic olefins having at least 10 carbon atoms.

Preparation of the copolymers

The copolymers are preferably prepared by reacting the above-mentioned monomers by free-radical copolymerization, preferably followed by at least partial hydrolysis and neutralization of the carboxyl groups formed during the hydrolysis with bases. The hydrolysis and neutralization are preferably carried out essentially completely, in particular completely.

The copolymers can be prepared by all known conventional polymerization processes, for example by bulk, emulsion, suspension, precipitation or solution polymerization. All the polymerization processes mentioned are carried out with exclusion of oxygen, preferably in a stream of nitrogen. For all the polymerization methods, conventional apparatuses are used, for example stirred reactors, stirred reactor cascades, autoclaves, tubular reactors and compounders. Preference is given to solution, precipitation, suspension and bulk polymerization. These polymerization processes can be carried out at from 50 to 300° C., preferably at from 80 to 200° C. Depending on the choice of the polymerization conditions, mean molecular weights of from 800 to 1,000,000 can be produced. Preference is given to weight average molecular weights in the range from 1000 to 150,000. Particular preference is given to weight average molecular weights in the range from 1000 to 30,000.

The copolymerization is preferably carried out in the presence of compounds which form free radicals. Up to 15% by weight, preferably from 0.2 to 8% by weight, based on the amount of monomers employed in the copolymerization, of these compounds are required. Examples of suitable polymerization initiators are peroxide compounds, such as tert-butyl perpivalate, tert-butyl perneodecanoate, tert-butyl per-2-ethyl-hexanoate, tert-butyl perisobutyrate, di-tert-butyl peroxide, di-tert-amyl peroxide, diacetyl peroxydicarbonate and dicyclohexyl peroxydicarbonate, and azo compounds, such as 2,2'-azobisisobutyronitrile. The initiators can be used alone or in the form of a mixture with one another.

The copolymerization can also be carried out in the presence of redox coinitiators, for example benzoin, dimethylaniline or ascorbic acid or complexes of heavy metals, such as copper, cobalt, iron, manganese, nickel and chromium, which are soluble in organic solvents. Owing to the catalytic acceleration of peroxide decomposition, the polymerization can be carried out at lower temperatures in the presence of redox coinitiators. Redox coinitiators are usually used in amounts of from about 0.1 to 1000 ppm, based on the amounts of monomers employed. If polymerization of the reaction mixture is commenced at the lower limit of the temperature range suitable for the polymerization and is subsequently completed at a higher temperature, it is expedient to use at least two different initiators which decompose at different temperatures, so that an adequate concentration of free radicals is available in each temperature range.

In order to prepare polymers of low mean molecular weight, it is frequently expedient to carry out the copolymerization in the presence of regulators. For this purpose, conventional regulators can be used, such as $C_1$- to $C_4$-aldehydes, formic acid and organic compounds containing SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan. The polymerization regulators are generally employed in amounts of from 0.1 to 10% by weight, based on the monomers. The choice of suitable solvents can also affect the mean molecular weight. For example, polymerization in the presence of diluents containing benzylic H atoms results in a reduction in the mean molecular weight owing to chain transfer.

In order to prepare relatively high-molecular-weight copolymers, it is frequently expedient to carry out the polymerization in the presence of chain extenders. These chain extenders are compounds containing di- or polyethylenically unsaturated groups, such as divinylbenzene, pentaerythrityl triallyl ether, esters of glycols, such as glycol diacrylate, glycerol triacrylate and polyethylene glycol diacrylate. They can be added during the polymerization in amounts of up to 5% by weight.

In the case of precipitation and suspension polymerization, the use of emulsifiers or protective colloids may be advantageous in order to stabilize the droplets or particles. Examples of emulsifiers which can be employed are alkylphenol ethoxylates, primary alcohol ethoxylates, linear alkylbenzenesulfonates, alkyl sulfates, EO/PO block copolymers, alkylpolyglucosides, N-($C_9$–$C_{20}$-acyl)amino acids, such as N-oleylsarcosine and N-stearylsarcosine, and monoesters and monoamides of sulfosuccinic acid.

Examples of protective colloids which can be used are cellulose derivatives, polyethylene glycol, polypropylene glycol, copolymers of ethylene oxide and propylene oxide, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimidepolyvinyl-1,3-oxazolidin-2-methyimidazoline, and copolymers containing maleic acid or maleic anhydride, as described, for example, in DE-C-25 01 123. The emulsifiers or protective colloids are usually employed in concentrations of from 0.05 to 15%, based on the monomers.

Examples of solvents and diluents which can be employed in the preparation of the polymers described by solution, precipitation or suspension polymerization are toluene, o-xylene, p-xylene, ethylbenzene, technical-grade mixtures of alkylaromatic compounds, cyclohexane, technical-grade mixtures of aliphatic compounds, acetone, cyclohexanone, tetrahydrofuran, dioxane, glycols and glycol derivatives, polyalkylene glycols and derivatives thereof, diethyl ether, tertbutyl methyl ether, methyl acetate, or mixtures of various solvents.

The copolymerization can be carried out continuously or batchwise. A multiplicity of variants are possible for carrying out the polymerization. In the usual procedure, some of the monomers are introduced, if desired in a suitable diluent and if desired in the presence of an emulsifier, protective colloid or further auxiliaries, the system is rendered inert, and the temperature is increased until the desired polymerization temperature has been reached. However, it is also possible merely to introduce a suitable diluent initially and to meter in the free-radical initiator, further monomers and other auxiliaries, such as regulators or crosslinking agents, in each case if desired in a diluent, within a defined period. The feed times can be chosen to be different. For example, a longer feed time can be chosen for the initiator feed than for the monomer feed.

If the polymer is obtained by solution polymerization, it can be isolated by evaporating the solvent, for example in a spray dryer. If the solvent used is steam-volatile, the diluent can be removed by introducing steam. If the polymer is obtained from precipitation or suspension polymerization, the diluent can be removed, for example, in a paddle dryer. If the diluent used is steam-volatile, it can be removed by introducing steam.

A product prepared by bulk polymerization can be converted into an aqueous solution or dispersion by, for example, adding water to the polymer at the end of the polymerization, and dissolving or dispersing the mixture at a suitable temperature.

The copolymer is preferably employed as a solution or colloidal solution.

The (preferred) treatment, of the polymer containing anhydride groups with water converts the anhydride groups into carboxyl groups. At least some, preferably all, of the carboxyl groups are then neutralized by means of bases. However, the hydrolysis and neutralization can also be carried out simultaneously by addition of dilute aqueous bases to the copolymer. Examples of suitable bases for neutralization of the carboxyl groups are sodium hydroxide solution, potassium hydroxide solution, magnesium hydroxide, calcium hydroxide, sodium carbonate, potassium carbonate, ammonia and primary, secondary or tertiary amines. The neutralization is preferably carried out by adding aqueous sodium hydroxide solution to the copolymer. The neutralization of the copolymers containing anhydride groups is carried out at least to such a degree that water-dispersible copolymers are obtained. This degree of neutralization is at least 10% of the total number of carboxyl groups formed from the anhydride groups. The amounts of water and neutralizing agent are selected so that commercial dispersions or solutions having a solids content of from 10 to 80% by weight, preferably from 20 to 60% by weight, are formed.

The resultant copolymers containing anhydride groups can be partially esterified by reaction with hydroxyl-functionalized compounds. The esterification is preferably carried out in the absence of water. Suitable alcohols can contain from 1 to 40 carbon atoms, preferably from 3 to 30 carbon atoms. Primary, secondary and tertiary alcohols can be used.

Both saturated aliphatic alcohols and unsaturated alcohols, such as oleyl alcohol, can be employed. Preference is given to monohydric primary or secondary alcohols, for example methanol, ethanol, n-propanol, isopropanol, n-butanol, isobutanol, n-pentanol and isomers thereof, n-hexanol and isomers thereof, n-octanol and isomers thereof, for example 2-ethylhexanol, nonanols, decanols, dodecanols, tridecanols, cyclohexanol, tallow fatty alcohol, stearyl alcohol and technical-grade alcohols or alcohol mixtures having 9 to 19 carbon atoms which are readily accessible by the oxo synthesis, such as $C_{9/11}$-oxo alcohols and $C_{13/15}$-poxo alcohols. It is also possible to use products of the alkoxylation of $C_1$–$C_{40}$-alcohols.

Preference is given to alcohols having 4 to 24 carbon atoms, such as n-butanol, isobutanol, amyl alcohol, 2-ethylhexanol, tridecanol, tallow fatty alcohol, stearyl alcohol, $C_{9/11}$-oxo alcohols and $C_{13/15}$-oxo alcohols. Conversion of some of the anhydride groups into monoester groups is followed by hydrolysis of the remaining anhydride groups in the polymer. The hydrolysis of the remaining anhydride groups in the copolymer can also be carried out at the same time as partial neutralization by adding an aqueous base to the partially esterified copolymer which still contains anhydride groups. In order to accelerate the hydrolysis of the anhydride groups, a suitable catalyst, for example a pyridine derivative, such as 4-dimethylaminopyridine, can also be added if desired. On the other hand, it is also possible to leave a certain proportion of unhydrolyzed dicarboxylic anhydride groups in the aqueous formulation.

The copolymers can also be solvolyzed by adding primary and/or secondary amines. The solvolysis is carried out using amounts of amines such that some, preferably from 10 to 50% of the total number of carboxyl groups formed from the copolymerized dicarboxylic anhydride units are amidated. The formation of monoamide groups in the copolymer is followed by neutralization, which is carried out until at least 10% of the remaining carboxyl groups are neutralized. Examples of suitable amines are methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine, oleylamine, dimethylamine, diethylamine, di-n-propylamine, diisopropylamine, di-n-butylamine, diisobutylamine, dihexylamine, dicyclohexylamine, dimethylcyclohexylamine, di-2-ethylhexylamine, di-n-octylamine, diisotridecylamine, di(tallow fatty)amine, distearylamine, dioleylamine, ethanolamine, diethanolamine, triethanolamine, n-propanolamine, di-n-propanolamine and morpholine.

Choice of suitable reaction conditions allows imide structures to be formed from the dicarboxylic anhydride units of the copolymer using ammonia or primary amines. These imide-functionalized copolymers can be converted into an aqueous dispersion or solution analogously to the esterified or amidated copolymers.

Furthermore, the above-described copolymers containing anhydride groups can also be reacted with aminocarboxylic acids containing a primary or secondary amino group. Suitable aminocarboxylic acids are all amino acids or mixtures of amino acids which contain a primary or secondary amino group, such as glycine, alanine, β-alanine, valine, leucine, methionine, cysteine, aminocaproic acid, caprolactam, asparagine, isoasparagine, glutamine, isoglutamine, aminodicarboxylic acids, such as aspartic acid, glutamic acid and casein, N-methylamino acids, such as N-methylglycine (sarcosine), and hydroxyproline, serine, threonine, proline, iminodiacetic acid, and basic diaminocarboxylic acids, such as lysine, lysine hydrochloride, arginine, histidine and α-aminocaprolactam, Particular preference is given to sarcosine and aspartic acid.

The solvolysis of the above-described copolymers containing anhydride groups using aminocarboxylic acids containing a primary or secondary amino group is preferably carried out in an aqueous medium. It is advantageous here to employ the aminocarboxylic acids containing a primary or secondary amino group in the form of their alkali metal, alkaline earth metal or ammonium salts. The solvolysis is carried out using such amounts of arninocarboxylates that 5 to 60% of the total number of carboxyl groups formed from the copolymerized dicarboxylic anhydride units are amidated. This is followed by neutralization, in which preferably at least 10% of the total number of carboxyl groups formed from the copolymer containing anhydride groups are neutralized.

The resultant aqueous solutions or dispersions of the copolymer are stable and have a long shelf life. They are highly suitable for the finishing of leather and fur skins, since, in addition to a particularly pronounced retanning, fat-liquoring and hydrophobicizing action, they also have particularly good penetration properties. Besides the filling properties, the fat-liquoring and hydrophobic properties support the action of the fat-liquoring and hydrophobicizing agents, so that the amounts of these used can be reduced. It is also possible to employ mixtures of the aqueous copolymer solutions and dispersions described with known hydrophobicizing, fat-liquoring and retanning agents. For example, the penetration behavior of a paraffin-based hydrophobicizing agent can be significantly improved by pretreating the leather with the novel copolymer solutions or dispersions. The leather and fur material treated with this combination of the novel copolymer solutions and dispersions and known hydrophobicizing agents still exhibits a low water absorption capacity and water permeability, but has excellent water vapor permeability (wearing comfort).

The solutions or dispersions used in accordance with the invention can be admixed with fat-liquoring agents or hydrophobicizing agents in amounts of up to 40% by weight, based on the amount of copolymer, in order to prepare a leather fat-liquoring composition having improved penetration properties. These emulsifier-containing aqueous dispersions or solutions have an excellent fat-liquoring and filling action at the same time as very good penetration properties. Suitable emulsifiers are conventional nonionic or anionic emulsifiers, such as alkoxylated fatty alcohols or oxo alcohols, block copolymers comprising ethylene oxide and propylene oxide units, alkoxylated fatty acids, ethoxylated fatty acid amides, fatty acid alkanolamides, fatty acid ammonium salts, fatty alcohol phosphates, alkylglucosides, alkylphenol alkoxylates, 2-sulfosuccinic monoesters or diesters or N-acylamino acids, or mixtures thereof.

Of particular importance are mixtures of the above-described copolymers and synthetic aromatic tanning agents (known as syntans), and precursors thereof, or alkali metal and ammonium salts of these compounds. Examples of precursors which may be mentioned are naphthalene, biphenyl, terphenyl, phenols, cresols, 4,4'-dihydroxydiphenyl sulfone, β-naphthol, dihydroxybenzenes, resorcinol, 2,2'-bis(hydroxyphenyl) propane, diphenyl ether and ditolyl ether. These precursors are reacted with sulfonating agents, such as oleum or sulfuric acid, in a manner known to the person skilled in the art to give the uncondensed, anionic precursors.

The various ways of preparing anionic, aromatic, synthetic tanning agents by condensing the above precursors with suitable condensing agents, such as formaldehyde or glyoxals, and possible coproducts, such as urea, melamine, dicyandiamide, sulfonamides and lignin sulfonates, are known to the person skilled in the art and are described in detail in the literature (see, for example, Ullmann's Enzyklopadie der technischen Chemie, Vol. 16 (4), pp. 111–117 (1979)).

The novel leather-treatment compositions comprising a combination of the above-described copolymers and synthetic aromatic tanning agents or precursors thereof comprise, based on the solids content, 1 to 80% of copolymer and 20 to 99% of synthetic aromatic tanning agent, preferably 5 to 50% of copolymer and 50–95% of synthetic aromatic tanning agent. The copolymer can, as described above, consist of components A, B and C or A, B, C and D.

Preference is given to aqueous dispersions or solutions in which at least 50% by weight of the copolymer is in solution, including colloidal solutions. In a particularly preferred embodiment, the copolymers or reaction products thereof are employed in the form of clear, aqueous solutions, including colloidal solutions.

Preference is given to aqueous dispersions or solutions of copolymers or reaction products thereof which are built up from a greater proportion by weight of water-soluble monomers and a lesser proportion by weight of water-insoluble monomers.

The novel dispersions or solutions may furthermore contain protective colloids in amounts of up to 40% by weight, based on the amount of copolymer. These aqueous dispersions or solutions containing protective colloids likewise have an excellent fat-liquoring and filling action at the same time as very good penetration properties. The protective colloids employed are, for example, polyvinyl alcohol, degraded starch, modified starches, carboxymethylcellulose, hydroxyethylcellulose and polyvinylpyrrolidone.

The invention also relates to a process for hydrophobicizing leather material, in particular leather or fur skins, which comprises treating the leather material, in a first step, with an aqueous solution or dispersion of a copolymer as described above, or a leather treatment composition as described above, and then treating the leather material, in a second step, in particular with chromium salts in order to deactivate the hydrophilicity of the copolymer.

The invention is explained in greater detail below by means of examples.

EXAMPLES

Unless stated otherwise, the percentages relate to the weight. The weight-average molecular weight was determined by gel permeation chromatography at 23° C. The eluent employed was an aqueous tris(hydroxymethyl)amino-methane (TRIS) buffer solution (0.08 molar). The chromatography columns were charged with TSK PW-XL 3000 and TSK PW-XL 5000 (TosoHaas) as stationary phase. A differential refractometer was used for detection. Calibration was carried out using an aqueous sodium polyacrylate solution using the calibration method of M. J. R. Cantow et al. (J. Polym. Sci., A-1, 5 (1967), 1391–1394).

Example 1

A diluent (D) o-xylene (750 ml) and 25% of the total amount of monomer (a) maleic anhydride (24.5 g) were introduced into a 2 l pressure reactor with metering and distillation devices. 3 bar of nitrogen were introduced and released again, and this operation was repeated twice. A reduced pressure of 91 mbar was then established by evacuation, and the mixture was heated to the reaction temperature (T) of 120° C. While maintaining this temperature, the following were metered in, starting at the same time: monomer (a) maleic anhydride (73.5 g) over the course of ta=3 hours, monomer (b) isobutene (45 g) over the course of tb=4 hours, monomer (c) $C_{20-24}$-olefin (29.6 g) over the course of tc=2 hours, monomer (d) acrylic acid (7.2 g) over the course of td=3 hours, initiator (i) solution of 5.4 g of tert-butyl perethylhexanoate in 100 g of xylene over the course of ti=5 hours. When the addition was complete, the reaction mixture was polymerized for a further 2 hours at 120° C. with stirring. The mixture was then decompressed to atmospheric pressure, cooled to 90° C. and diluted with 100 g of water. The xylene was then removed as an azeotrope with water by introducing steam. When an internal temperature of 100° C. had been reached, the steam supply was switched off, and the mixture was neutralized to a pH of 7.5 using sodium hydroxide solution (50% by weight). Cooling gave a clear solution with a solids content (SC) of 44.5% by weight. The weight average molecular weight (MW) of the dissolved polymeric salt was 4500 g/mol.

| Example No. | D | T [° C.] | (a) | ta | (b) | tb | (c) | tc | (d) | td | (i) | ti | SC [%] | MW |
|---|---|---|---|---|---|---|---|---|---|---|---|---|---|---|
| 2 | X | 120 | MA 98.0 g | 2 | IB 53.8 g | 5 | $C_{20-24}$ 11.8 g | 2 | — | — | tBEH 4.9 g | 6 | 42.5 | 4200 |
| 3 | X | 120 | MA 127.4 g | 3 | E 16.8 g | 5.5 | $C_{20-24}$ 29.6 g | 3 | — | — | tBEH 5.2 g | 6 | 44.3 | 2900 |
| 4 | X | 120 | MA 98.0 g | 3 | P 12.0 g | 5 | $C_{20-24}$ 42.3 g | 2 | — | — | tBEH 4.6 g | 6 | 41.4 | 2100 |
| 5 | X | 130 | MA 98.0 g | 3 | IB 50.4 g | 5 | $C_{18}$ 25.2 g | 2 | — | — | DBP 5.2 g | 5,5 | 42.3 | 2400 |
| 6 | X | 120 | MA 98.0 g | 3 | CP 54.4 g | 5 | $C_{12}$ 16.8 g | 2 | DMA 14.3 g | 5 | tBEH 5.1 g | 6 | 42.5 | 2800 |
| 7 | EB | 120 | MA/IA* 41.1 g | 3 | HX 32.9 g | 5 | StA 84.5 g | 2 | MAA 22.4 g | 5 | tBEH 5.4 g | 6 | 43.6 | 1400 |
| 8 | X | 130 | MA 98.0 g | 3 | IB 42.0 g | 5 | $C_{18}$ 12.6 g | 2 | St 5.2 g | 5 | DBP 4.7 g | 6 | 42.5 | 3100 |
| 9 | X | 90 | MA 98.0 g | 3 | IB 50.4 g | 5 | $C_{18}$ 12.6 g | 2 | MMA 5.0 g | 5 | tBEH 5.0 g | 6 | 43.3 | 5800 |

-continued

| Example No. | D | T [° C.] | (a) | ta | (b) | tb | (c) | tc | (d) | td | (i) | ti | SC [%] | MW |
|---|---|---|---|---|---|---|---|---|---|---|---|---|---|---|
| 10 | X | 90 | MA 98.0 g | 6 | IB 50.4 g | 7 | $C_{18}$ 12.6 g | 4 | St 10.4 g | 7 | tBEH 2.2 g | 6 | 44.8 | 23,000 |

(a): Monomer (A); (b): Monomer (B); (c): Monomer (C); (d): Monomer (D); ta: Feed time of monomer (A); tb: Feed time of monomer (B); tc: Feed time of monomer (C); td: Feed time of monomer (D); (i) Free-radical initiator; ti: Feed time of free-radical initiator; SC: Solids content; MW: Weight average molecular weight; MA: Maleic anhydride; IA: Itaconic anhydride; E: Ethene; P: Propene; IB: Isobutene; CP: Cyclopentene; HX: 1-Hexene; $C_{20-24}$: $C_{20-24}$-olefin; $C_{18}$: $C_{18}$-olefin; $C_{12}$: $C_{12}$-olefin; St: Styrene; MAA: Methacrylic acid; StA: Stearyl acrylate; MMA: Methyl methacrylate; DMA: Dimethylaminoethyl acrylate; tBEH: tert-butyl per-2-ethylhexanoate; DBP: Di-tert-butyl peroxide; D: Diluent; X: Xylene; EB: Ethylbenzene
*Equimolar mixture of MA and IA Applicational Testing on Leather Recipe No.:1
Starting material: chrome-tanned towel wet blue
Shaving thickness: 1.8 mm
Percentages relate to: shaved weight

| | | |
|---|---|---|
| Washing: | 200% Water 35° C. | 10 min Drain liquor |
| Neutralization: | 75% Water 35° C. 1.5% Sodium formate 1.0% Sodium bicarbonate Liquor pH: 5.0 Cut (BKG): | 120 min Drain liquor uniformly |
| Washing: | 200% Water 35° C. | 10 min Drain liquor |
| Retanning: | 100% Water 50° C. x % Dispersion of the invention + 4% Chestnut 0.2% Ammonia 25% | 40 min 30 min 5 min |
| Dyeing: | + 2% Luganil ® Braun NGB | 30 min |
| Hydrophobicization: | + y% Hydrophobicizing agent | 80 min |
| Solidification: | + 1.5% Formic acid 85% pH(liquor) = 3.5 | 2 × 10 min + 20 min Drain liquor |
| Washing: | 200% Water 35° C. | 10 min Drain liquor |
| Fixing: | 100% Water 30° C. 3% Chromitan ® FM | 120 min Drain liquor |
| Washing: | 2 × 200% Water 25° C. | 10 min Drain liquor |

Set out leather overnight on a trestle, vacuum for 2 minutes/80° C., hang drying, conditioning, stretching, kiss plate Aplicational Testing on Leather Recipe No.:2
Starting material: chrome-tanned towel wet blue
Shaving thickness: 1.8 mm
Percentages relate to: shaved weight

| | | |
|---|---|---|
| Washing: | 200% Water 35° C. | 10 min Drain liquor |
| Neutralization: | 75% Water 35° C. 1.5% Sodium formate 0.5% Sodium bicarbonate + x % Dispersion of the invention Liquor pH: 5.0 Cut (BKG): | 30 min 90 min Drain liquor uniformly |
| Washing: | 200% Water 35° C. | 10 min Drain liquor |
| Retanning: | 100% Water 40° C. + 4% Chestnut 0.2% Ammonia 25% | 30 min 5 min |
| Dyeing: | + 2% Luganil ® Braun NGB | 30 min |
| Hydrophobicization: | + y% Hydrophobicizing agent | 80 min |
| Solidification: | + 1.5% Formic acid 85% pH(liquor) = 3.5 | 2 × 10 min + 20 min Drain liquor |
| Washing: | 200% Water 35° C. | 10 min Drain liquor |
| Fixing: | 100% Water 30° C. 3% Chromitan ® FM | 120 min Drain liquor |
| Washing: | 2 × 200% Water 25° C. | 10 min Drain liquor |

Set out leather overnight on a trestle, vacuum for 2 minutes/80° C., hang drying, conditioning, stretching, kiss plate

| | | Applicational testing | | | | |
|---|---|---|---|---|---|---|
| Experiment No. | Recipe No. | Dispersion from Ex. No. | Amount employed x | Hydrophobicizing agent | Amount employed y | Static WA (%) | Maeser flexes (thous.) |
| I | 1 | 2 | 2 | A | 3.3 | 32 | 8 |
| II | 1 | 8 | 2 | B | 2.5 | 27 | 17 |
| III | 1 | 9 | 2 | B | 2.5 | 28 | 16 |
| IV | 1 | 10 | 2 | B | 2.5 | 30 | 16 |
| V | 1 | 3 | 2 | A | 3.3 | 25 | 22 |
| VI | 1 | 4 | 2 | B | 2 | 22 | 77 |
| VII | 1 | 7 | 2 | A | 3.3 | 29 | 7 |
| VIII | 1 | 1 | 2 | B | 2.5 | 24 | 45 |
| IX | 1 | 3 | 4 | B | 2.5 | 24 | 69 |
| X | 1 | 6 | 3 | B | 2.5 | 27 | 25 |
| XI | 1 | Relugan RE | 2 | A | 3.3 | 29 | 1 |
| XII | 1 | Relugan RE | 2 | B | 2.5 | 33 | 11 |

-continued

Applicational testing

| Experiment No. | Recipe No. | Dispersion from Ex. No. | Amount employed x | Hydrophobicizing agent | Amount employed y | Static WA (%) | Maeser flexes (thous.) |
|---|---|---|---|---|---|---|---|
| XIII | 2 | 6 | 2 | A | 3.3 | 29 | 3 |
| XIV | 2 | 7 | 2 | B | 2.5 | 30 | 15 |
| XV | 2 | 1 | 2 | B | 2.5 | 23 | 39 |
| Notes | | 0 | 1 | 2 | 1 | 3 | 4 |

0: Regulan ® RE is a polymeric tanning material from BASF AG for the retanning of chrome leather
1: solids content (110° C./2 h)
2:
A = Densodrin EN (approximately 42% paraffin emulsion from BASF AG)
B = Densodrin CD (approximately 50% paraffin/polysiloxane emulsion from BASF AG)
3: Increase in weight on storage in demineralized water for 1 hour; size corresponds to the Maeser test specimen
4: In accordance with ASTM D 2099-70
Leathers I to III, V to IX and XV are soft and have a pleasant hand, and dye penetration is level and very good.
Leathers IV and X to XIII are quite firm, have a round, pleasant hand, again with level and good dye penetration.
Leathers XI and XIII additionally have a slightly waxy hand.

We claim:
1. A leather treatment composition, comprising:
from 1 to 80% by weight of an aqueous solution or dispersion of a copolymer obtained by free-radical copolymerization of:
(a) from 50 to 70% by weight of at least one monoethylenically unsaturated $C_{4-6}$-dicarboxylic acid or the anhydride thereof, as component A;
(b) from 10 to 40% by weight of at least one olefin having 2 to 6 carbon atoms, as component B;
(c) from 5 to 30% by weight of at least one hydrophobic comonomer selected from the group consisting of long-chain olefins having at least 10 carbon atoms, esters of long-chain alcohols having at least 8 carbon atoms with acrylic acid or methacrylic acid, long-chain amides having at least 8 carbon atoms with acrylic acid or methacrylic acid, and long-chain alkyl vinyl ethers having at least 8 carbon atoms, as component C;
(d) from 0 to 40% by weight of further comonomers which can be copolymerized with the above monomers, as component D;
where the sum of the amounts of components A, B, C and, if used, D is 100% by weight;
followed by at least partial esterification or hydrolysis of said component A, then neutralization and/or reaction of the carboxyl groups formed during said hydrolysis with bases; and
from 20 to 99% by weight of at least one synthetic aromatic tanning agent.
2. A process for hydrophobicizing leather material, comprising:
treating a leather material in a first step with a leather treatment composition as defined in claim 1, and then
treating the leather material in a second step in order to deactivate the hydrophilicity of the copolymer.
3. The process of claim 2, wherein the leather material is a leather or a fur skin.
4. The process of claim 2, wherein the leather material is treated with a chromium salt in the second step.
5. The composition as claimed in claim 1, wherein
the copolymer component A is at least one comonomer selected from the group consisting of maleic anhydride, itaconic anhydride and citraconic anhydride; and/or
component B is at least one comonomer selected from the group consisting of ethene, propene, 1-butene, isobutene, 1-hexene, cyclopentene and cyclohexene; and/or
component C is at least one aliphatic olefin having at least 10 carbon atoms; and/or
component D is at least one comonomer selected from the group consisting of acrylic acid, methacrylic acid, methyl vinyl ether, ethyl vinyl ether, 2-acrylamido-2-methylpropanesulfonic acid, methyl (meth)acrylate, ethyl (meth)acrylate, butyl (meth) acrylate, hydroxyethyl(meth)acrylate, hydroxypropyl(meth)-acrylate, 2-(N,Ndimethylamino)ethyl (meth)acrylate, 3-(N,N-dimethylamino)propyl (meth)acrylate, 3-dimethylaminopropyl (meth)acrylamide, vinyl acetate, vinyl propionate, N-vinylformamide, styrene, α-methylstyrene, N-vinylpyrrolidone, N-vinylimidazole, acrylonitrile, acrolein and methacrolein.
6. A method for retanning, fat-liquoring or, hydrophobicizing leather and/or fur skins, comprising:
applying the composition as claimed in claim 1 to the leather and/or fur skins.
7. A process for hydrophobicizing leather material, comprising:
treating the leather material with an aqueous solution or dispersion or a leather treatment composition as claimed in claim 1; and
treating the leather material with a chromium salt in order to deactivate the hydrophilicity of the copolymer.
8. The process of claim 1, wherein the leather material is a leather or fur skin.
9. The process of claim 7, wherein the leather material is treated with a chromium salt in order to deactivate the hydrophilicity of the copolymer.
10. A copolymer obtained by free-radical copolymerization of
(a) from 50 to 70% by weight of at least one monoethylenically unsaturated $C_{4-6}$-dicarboxylic acid or the anhydride thereof, as component A;
(b) from 10 to 40% by weight of at least one olefin having 2 to 6 carbon atoms, as component B;
(c) from 5 to 30% by weight of at least one hydrophobic comonomer selected from the group consisting of long-chain olefins having at least 10 carbon atoms, esters of long-chain alcohols having at least 8 carbon atoms with acrylic acid or methacrylic acid, long-chain amides having at least 8 carbon atoms of acrylic acid or methacrylic acid, and long-chain alkyl vinyl ethers having at least 8 carbon atoms, as component C; and

(d) from 1 to 15% by weight of further comonomers which can be copolymerized with the above monomers, as component D;

where the sum of the amounts of components A, B, C and D is 100% by weight;

optionally followed by at least partial esterification or hydrolysis of said component A, then neutralization and/or reaction of the carboxyl groups formed during said hydrolysis with bases.

11. A copolymer as claimed in claim 10, wherein component A is at least one comonomer selected from the group consisting of maleic anhydride, itaconic anhydride and citraconic anhydride; and/or component B is at least one comonomer selected from the group consisting of ethene, propene, 1-butene, isobutene, 1-hexene, cyclopentene and cyclohexene; and/or component C is at least one aliphatic olefin having at least 10 carbon atoms; and/or component D is at least one comonomer selected from the group consisting of acrylic acid, methacrylic acid, methyl vinyl ether, ethyl vinyl ether, 2-acrylamido-2-methylpropanesulphonic acid, methyl (meth)acrylate, ethyl (meth)acrylate, butyl (meth)acrylate, hydroxyethyl (meth)acrylate, hydroxypropyl (meth)acrylate, 2-(N,Ndimethylamino)ethyl (meth)acrylate, 3-(N,N-dimethylamino)propyl (meth)acrylate, 3dimethylaminopropyl(meth) acrylamide, vinyl acetate, vinyl propionate, N-vinylformamide, styrene, (x-methylstyrene, N-vinylpyrrolidone, N-vinylimidazole, acrylonitrile, acrolein and methacrolein.

12. A copolymer obtained by free-radical copolymerization of (a) from 50 to 70% by weight of at least one monoethylenically unsaturated $C_{4-6}$-dicarboxylic acid or the anhydride thereof, as component A;

(b) from 10 to 40% by weight of at least one olefin having 2 to 6 carbon atoms, as component B;

(c) from 5 to 30% by weight of at least one hydrophobic comonomer from the group consisting of long-chain olefins having at least 10 carbon atoms, esters of long-chain alcohols having at least 8 carbon atoms with acrylic acid or methacrylic acid, long-chain amides having at least 8 carbon atoms with acrylic acid or methacrylic acid, and long-chain alkyl vinyl ethers having at least 8 carbon atoms, as component C;

(d) from 1 to 40% by weight of at least one comonomer from the group consisting of acrylic acid, methacrylic acid, methyl methacrylate, N,N-dimethylaminoethyl acrylate and styrene, as component D;

where the sum of the amounts of components A, B, C and, if used, D is 100% by weight;

optionally followed by at least partial esterification or hydrolysis of said component A, then at least partial neutralization and/or reaction of the carboxyl groups formed during said hydrolysis with bases.

13. A copolymer as claimed in claim 12, wherein component A is at least one comonomer selected from the group consisting of maleic anhydride, itaconic anhydride and citraconic anhydride; and/or component B is at least one comonomer selected from the group consisting of ethene, propene, 1-butene, isobutene, 1-hexene, cyclopentene and cyclohexene; and/or component C is at least one comonomer selected from the group consisting of aliphatic olefins having at least 10 carbon atoms.

14. A process for the preparation of copolymers as claimed in claim 12, comprising:

reacting the monomers by free-radical copolymerization.

15. The process of claim 14, wherein, after the reacting by free-radical copolymerization, the carboxyl groups formed during the hydrolysis of said component A are at least partially neutralized with bases.

* * * * *